(12) United States Patent
Koehler et al.

(10) Patent No.: US 11,208,018 B1
(45) Date of Patent: Dec. 28, 2021

(54) HEADREST ASSEMBLY FOR A PIVOTING HEADREST

(71) Applicant: Ford Global Technologies, LLC, Dearborn, MI (US)

(72) Inventors: Juergen Koehler, Cologne (DE); Chris Fredriksson, LaSalle (CA); Timothy Dunn, Rochester Hills, MI (US); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/001,975

(22) Filed: Aug. 25, 2020

(51) Int. Cl.
*B60N 2/841* (2018.01)
*B60N 2/856* (2018.01)

(52) U.S. Cl.
CPC .............. *B60N 2/841* (2018.02); *B60N 2/856* (2018.02)

(58) Field of Classification Search
CPC ........ B60N 2/838; B60N 2/841; B60N 2/844; B60N 2/847
USPC ........................................................ 297/408
See application file for complete search history.

(56) References Cited

U.S. PATENT DOCUMENTS

| | | | |
|---|---|---|---|
| 3,506,306 A * | 4/1970 | Herzer | B60N 2/847 297/408 |
| 4,678,232 A * | 7/1987 | Ishida | B60N 2/847 297/408 |
| 5,669,668 A * | 9/1997 | Leuchtmann | B60N 2/859 297/408 |
| 7,073,863 B1 | 7/2006 | Low | |
| 8,303,039 B2 | 11/2012 | Mueller | |
| 8,348,347 B2 | 1/2013 | Willard | |
| 8,465,098 B2 | 6/2013 | Yetukuri | |
| 8,807,653 B2 | 8/2014 | Yetukuri | |
| 9,315,130 B2 | 4/2016 | Kondrad | |
| 9,573,499 B2 * | 2/2017 | Lutzka | B60N 2/3009 |
| 2005/0067874 A1 * | 3/2005 | Kamrath | B60N 2/859 297/408 |
| 2005/0088027 A1 * | 4/2005 | Yetukuri | B60N 2/818 297/408 |
| 2005/0156456 A1 * | 7/2005 | Robinson | B60N 2/22 297/408 |
| 2007/0152487 A1 * | 7/2007 | Brockman | B60N 2/844 297/408 |
| 2008/0238173 A1 * | 10/2008 | Sutter | B60N 2/856 297/391 |
| 2013/0140866 A1 * | 6/2013 | Yetukuri | B60N 2/844 297/408 |

* cited by examiner

*Primary Examiner* — Robert Canfield
(74) *Attorney, Agent, or Firm* — David Coppiellie; Price Heneveld LLP

(57) ABSTRACT

A headrest assembly includes a pivot pin rotatably coupled to a support structure. A pivot member extends outward from a headrest body and is coupled to the pivot pin. A lock assembly is disposed about the pivot pin and is operable between a disengaged condition and an engaged condition. In the engaged condition, rotation of the pivot pin relative to the support structure is generally prevented. A pulley wheel is operable to rotate about the pivot pin from a first position to a second position to prompt the lock assembly to enter the disengaged condition.

19 Claims, 5 Drawing Sheets

HEADREST ASSEMBLY FOR A PIVOTING HEADREST

FIELD OF THE DISCLOSURE

The present disclosure generally relates to a headrest assembly. More specifically, the present disclosure relates to a headrest assembly for a pivoting headrest of a vehicle seating assembly.

BACKGROUND OF THE DISCLOSURE

Seating assemblies, particularly vehicle seating assemblies, may be operable between use and stowed positions. In order to stow seating assemblies within vehicles in a space-efficient manner, headrests may be operable to move relative to seatbacks of the seating assemblies. A headrest assembly that is compact and that allows a headrest to pivot relative to a seatback may be desired.

SUMMARY OF THE DISCLOSURE

According to a first aspect of the present disclosure, a headrest assembly includes first and second pivot members extending outward from a headrest body. A pivot pin extends between the first and second pivot members and is rotatably coupled to a support structure. The first and second pivot members are configured to pivot relative to the support structure with rotation of the pivot pin relative to the support structure. A first locking feature is coupled to the pivot pin between the first and second pivot members and has an aperture through which the pivot pin extends. The first locking feature is configured to rotate with rotation of the pivot pin relative to the support structure. A second locking feature is coupled to the support structure between the first and second pivot members and has an aperture through which the pivot pin extends. The pivot pin is configured to rotate relative to the second locking feature. The first and second locking features are operable between an engaged condition, wherein the first and second locking features are relatively nearer to each other and rotation of the pivot pin relative to the support structure is generally prevented by the first and second locking features, and a disengaged condition. A pulley wheel is disposed between the first and second locking features and has an aperture through which the pivot pin extends. The pulley wheel is operable to rotate about the pivot pin from a first position to a second position. Rotation of the pulley wheel from the first position to the second position moves the first locking feature further away from the second locking feature, such that the first and second locking features enter the disengaged condition.

Embodiments of the first aspect of the present disclosure may include any one or a combination of the following features:
- a biasing feature disposed between the first and second pivot members and configured to yieldingly bias the first locking feature toward the second locking feature;
- the biasing feature comprises a coil spring at least partially coiled about the pivot pin;
- the pulley wheel includes a first contact surface and the second locking feature includes a second contact surface configured to contact the first contact surface of the pulley wheel, wherein contact between the first and second contact surfaces as the pulley wheel rotates from the first position to the second position about the pivot pin causes the pulley wheel to move along the pivot pin away from the second locking feature;
- the first and second contact surfaces respectively define first and second planes, each angled between an axis of rotation of the pulley wheel and a plane perpendicular to the axis of rotation, wherein the first and second planes are closer to parallel to each other in the first position of the pulley wheel than the second position of the pulley wheel; and
- the first plane is substantially parallel to the second plane in the first position of the pulley wheel.

According to a second aspect of the present disclosure, a headrest assembly includes a pivot pin. A support structure is operably coupled to the pivot pin. The pivot pin is configured to rotate relative to the support structure. A pivot member is coupled to the pivot pin. The pivot member is configured to rotate with the pivot pin to pivot a headrest body coupled to the pivot member. A first locking feature is coupled to the pivot pin and configured to rotate with the pivot pin. A second locking feature is coupled to the support structure. The first and second locking features are operable between a disengaged condition and an engaged condition, wherein the first and second locking features generally prevent rotation of the pivot pin relative to the support structure. A pulley wheel is operably coupled to the pivot pin between the first and second locking features and is operable to rotate about the pivot pin from a first position to a second position. Rotation of the pulley wheel from the first position to the second position prompts the first and second locking features to enter the disengaged condition.

Embodiments of the second aspect of the present disclosure may include any one or a combination of the following features:
- a biasing feature coupled to and configured to yieldingly bias the first locking feature toward the second locking feature;
- the biasing feature comprises a coil spring at least partially coiled about the pivot pin;
- at least one of the first and second locking features defines an aperture through which the pivot pin extends;
- the pulley wheel is configured to move along the pivot pin away from the second locking feature as the pulley wheel rotates about the pivot pin from the first position to the second position;
- the first locking feature comprises a pawl configured to be received by a receiver of the second locking feature in the engaged condition of the first and second locking features; and
- a cable is operably coupled to the pulley wheel and operable to move between an extended position and a retracted position, wherein movement of the cable from the retracted position to the extended position is configured to rotate the pulley wheel from the first position to the second position.

According to a third aspect of the present disclosure, a headrest assembly includes a pivot pin rotatably coupled to a support structure. A pivot member that extends outward from a headrest body is coupled to the pivot pin. A lock assembly is disposed about the pivot pin and is operable between a disengaged condition and an engaged condition, wherein rotation of the pivot pin relative to the support structure is generally prevented. A pulley wheel is operable to rotate about the pivot pin from a first position to a second position to prompt the lock assembly to enter the disengaged condition.

Embodiments of a third aspect of the present disclosure can include any one or a combination of the following features:

a biasing feature configured to bias the lock assembly to yieldingly retain the lock assembly in the engaged condition;

the lock assembly includes a first locking feature having an aperture through which the pivot pin extends and a second locking feature having an aperture through which the pivot pin extends, wherein the first and second locking features are configured to be engaged with each other to generally prevent rotation of the pivot pin relative to the support structure in the engaged condition of the lock assembly;

the first locking feature is operably coupled to the pivot pin, such that the first locking feature is configured to rotate with the pivot pin as the pivot pin rotates relative to the support structure, and the pivot pin is configured to rotate relative to the second locking feature;

the pulley wheel is disposed between the first and second locking features;

the pulley wheel is configured to move along the pivot pin away from the second locking feature as the pulley wheel rotates about the pivot pin from the first position to the second position; and a cable operably coupled to the pulley wheel and operable to move between an extended position and a retracted position, wherein movement of the cable from the retracted position to the extended position is configured to rotate the pulley wheel from the first position to the second position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
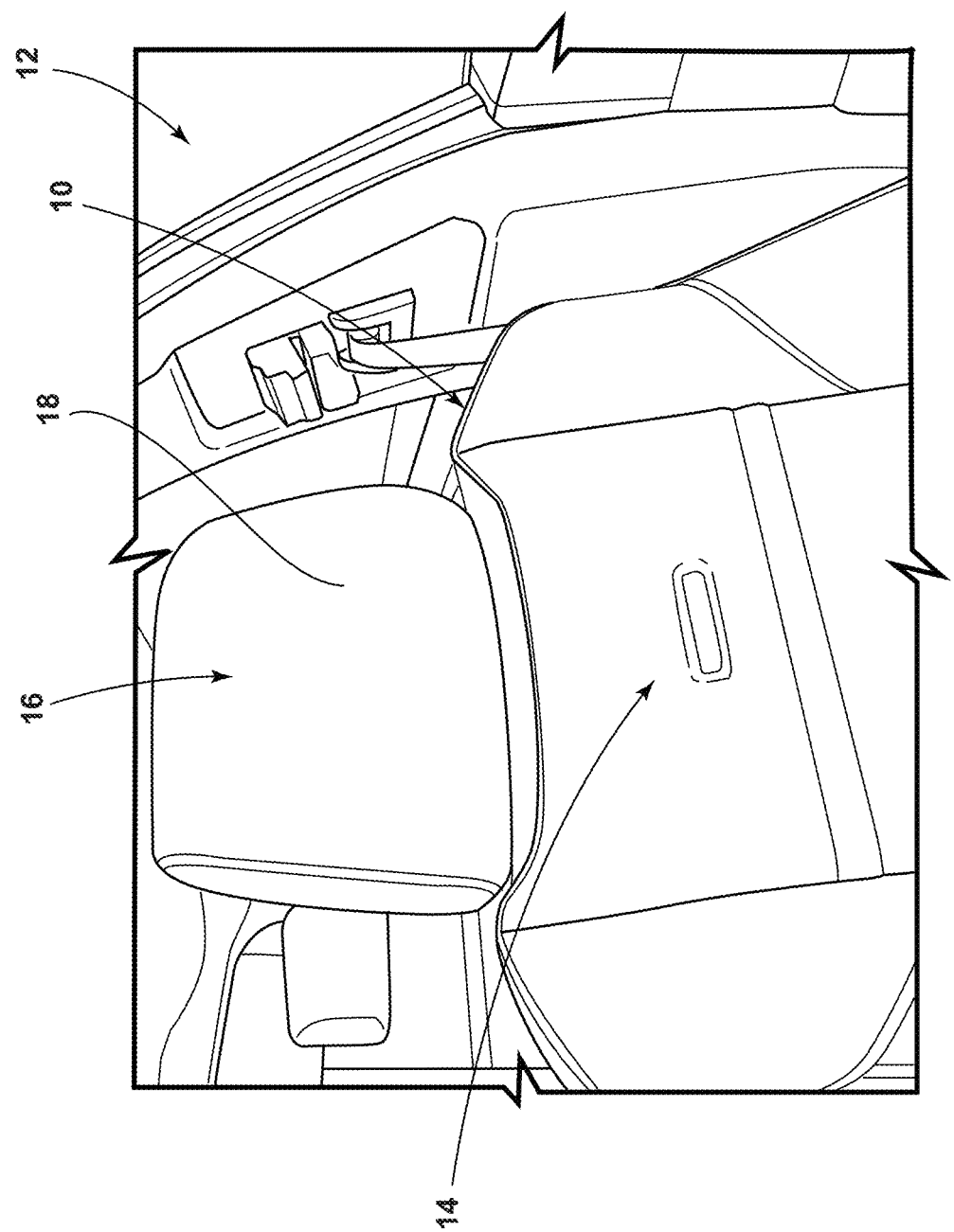
FIG. 1 is a perspective view of a vehicle seating assembly, illustrating a headrest coupled to a seatback of the seating assembly, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-4, a headrest assembly 16 includes first and second pivot members 46, 48 that extend outward from a headrest body 44. A pivot pin 28 extends between the first and second pivot members 46, 48 and is rotatably coupled to a support structure 20. The first and second pivot members 46, 48 are configured to pivot relative to the support structure 20 with rotation of the pivot pin 28 relative to the support structure 20. A first locking feature 62 is coupled to the pivot pin 28 between the first and second pivot members 46, 48. The first locking feature 62 includes an aperture 66 through which the pivot pin 28 extends. The first locking feature 62 is configured to rotate with rotation of the pivot pin 28 relative to the support structure 20. A second locking feature 64 is coupled to the support structure 20 between the first and second pivot members 46, 48. The second locking feature 64 includes an aperture 80 through which the pivot pin 28 extends. The pivot pin 28 is configured to rotate relative to the second locking feature 64. The first and second locking features 62, 64 are operable between an engaged condition, wherein the first and second locking features 62, 64 are relatively near to each other and rotation of the pivot pin 28 relative to the support structure 20 is generally prevented by the first and second locking features 62, 64, and a disengaged condition, wherein the first and second locking features 62, 64 are relatively further from each other and rotation of the pivot pin 28 relative to the support structure 20 is not generally prevented by the first and second locking features 62, 64. A pulley wheel 100 is disposed between the first and second locking features 62, 64. The pulley wheel 100 includes an aperture 102 through which the pivot pin 28 extends. The pulley wheel 100 is operable to rotate about the pivot pin 28 from a first position to a second position. Rotation from the first position to the second position moves the first locking feature 62 further away from the second locking feature 64, such that the first and second locking features 62, 64 enter the disengaged condition.

Figure 4:
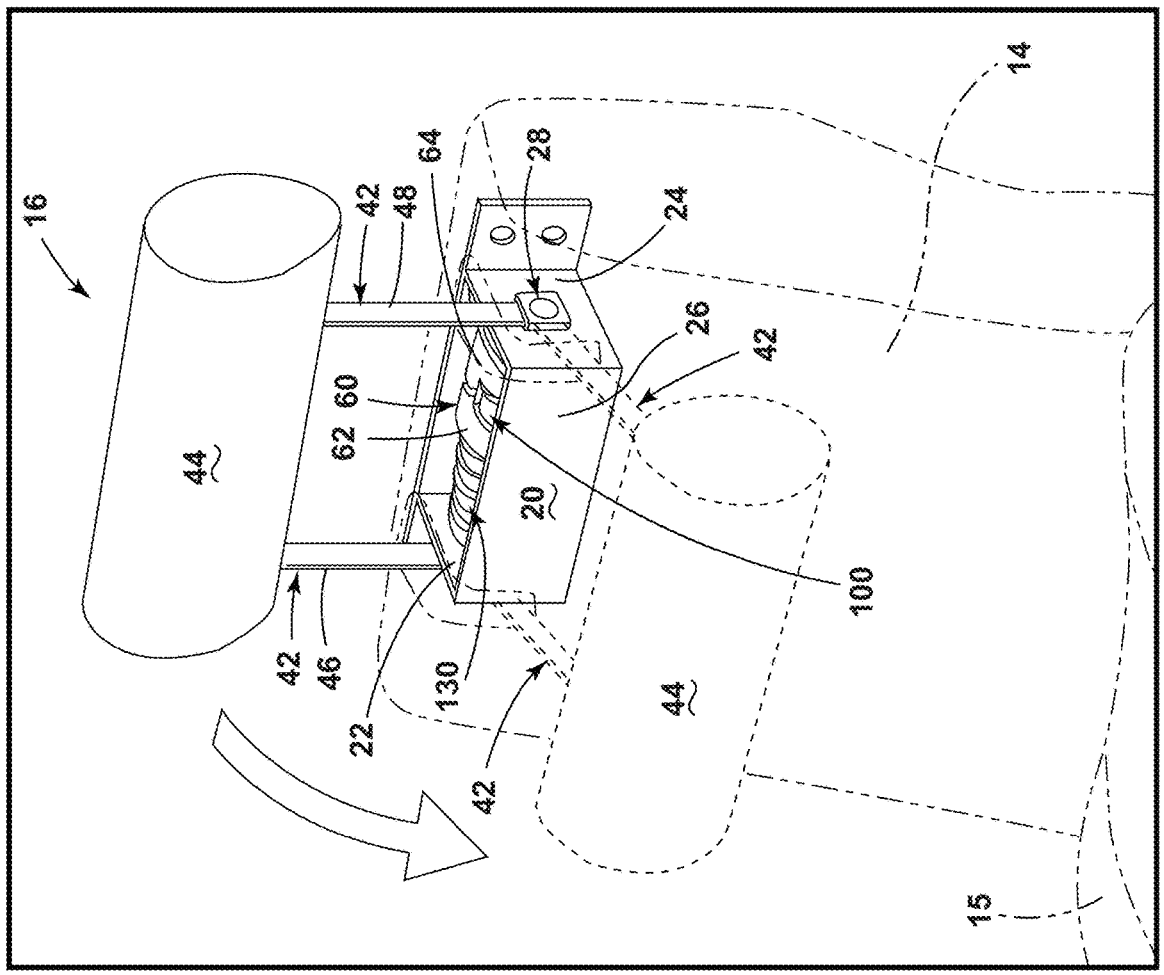
FIG. 4 is a perspective view of the headrest assembly, illustrating the headrest assembly in an upright position and the headrest assembly in a pivoted position in phantom, according to one embodiment.

In reference to FIGS. 1 and 4, a seating assembly 10 is illustrated. In some embodiments, the seating assembly 10 may be a vehicle 12 seating assembly 10. In other words, the seating assembly 10 may be disposed within a vehicle 12, as illustrated in FIG. 1. The seating assembly 10 may include a seatback 14 coupled to a seat base 15. The seating assembly 10 includes the headrest assembly 16. The headrest assembly 16 may be coupled to the seatback 14 of the seating assembly 10. The headrest assembly 16 may be partially disposed within the seatback 14, as illustrated in FIG. 4.

Figure 2:
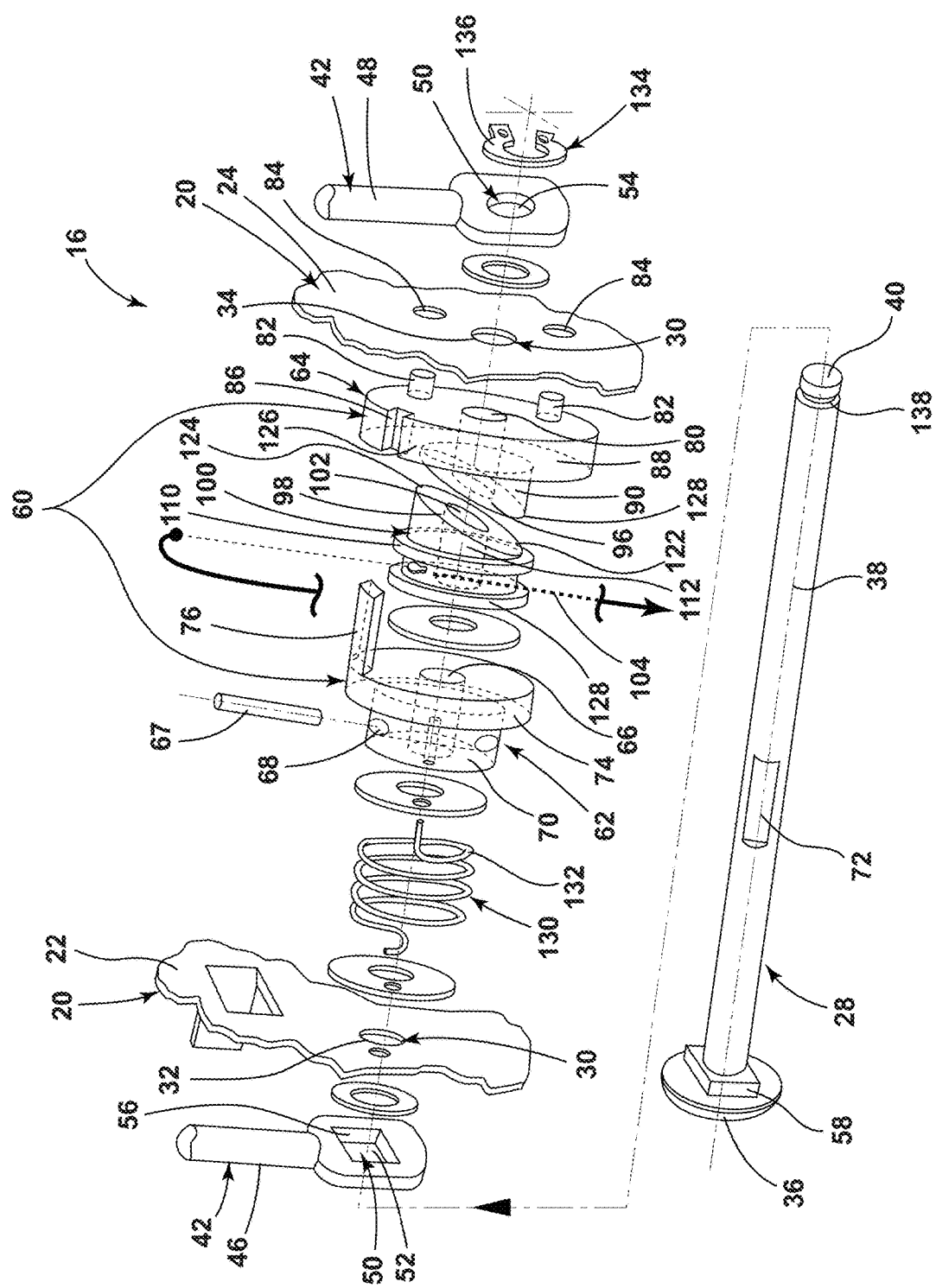
FIG. 2 is an exploded view of a portion of a headrest assembly, illustrating a pivot pin, pivot members, a biasing feature, a support structure, a lock assembly, and a pulley wheel, according to one embodiment.

Referring now to FIGS. 2-4, the headrest assembly 16 includes a support structure 20. In some embodiments, the support structure 20 may include a first side wall 22 and/or a second side wall 24. As illustrated in FIG. 4, in some implementations, one or more connecting sides 26 may extend between the first and second side walls 22, 24 of the support structure 20. The support structure 20 may be disposed within the seatback 14. In some implementations, the support structure 20 may be coupled to an upper portion of the seatback 14.

Figure 3A:
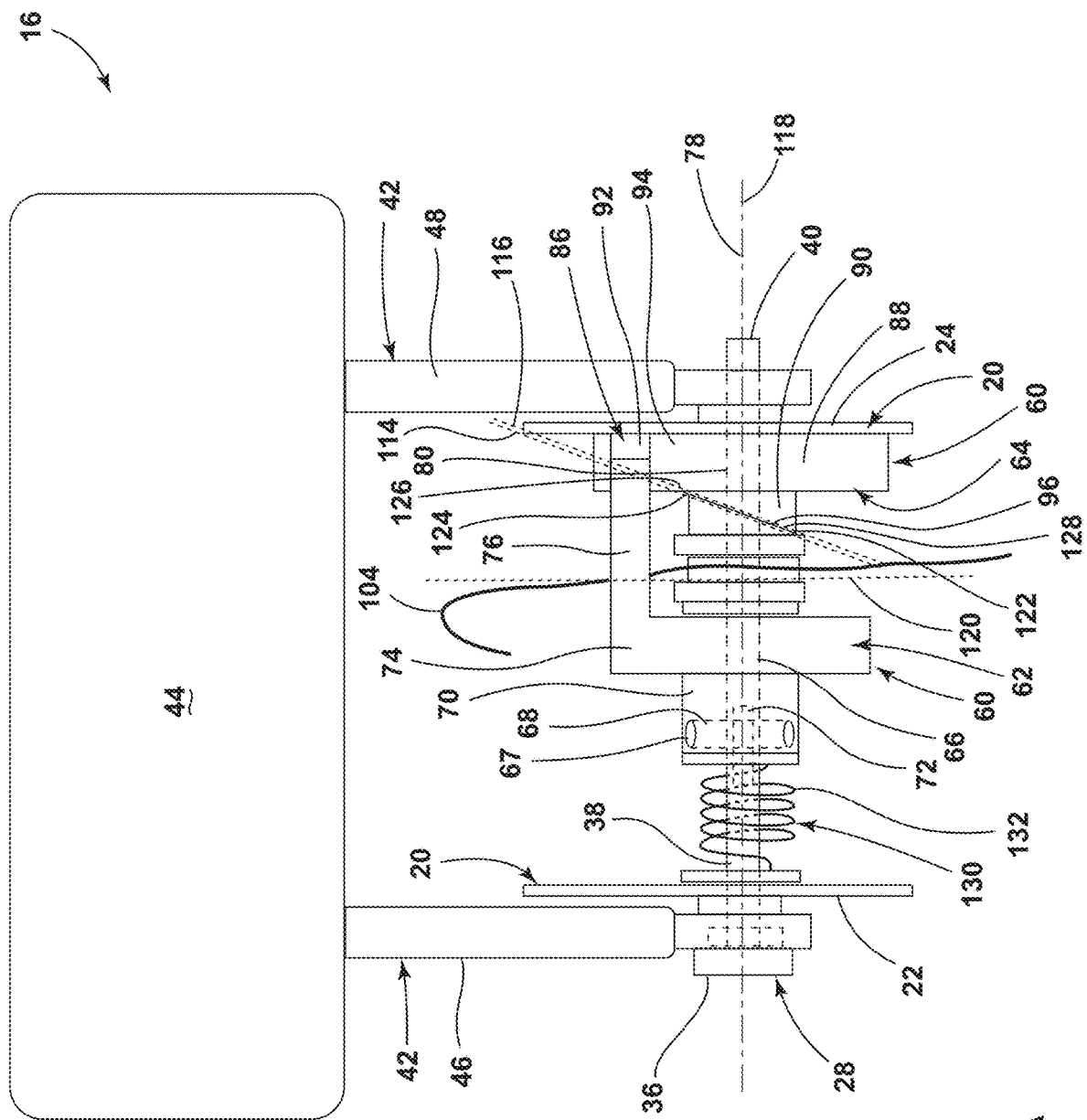
FIG. 3A is a frontal view of the headrest assembly, illustrating the lock assembly in an engaged condition and the pulley wheel in a first position, according to one embodiment.
Figure 3B:
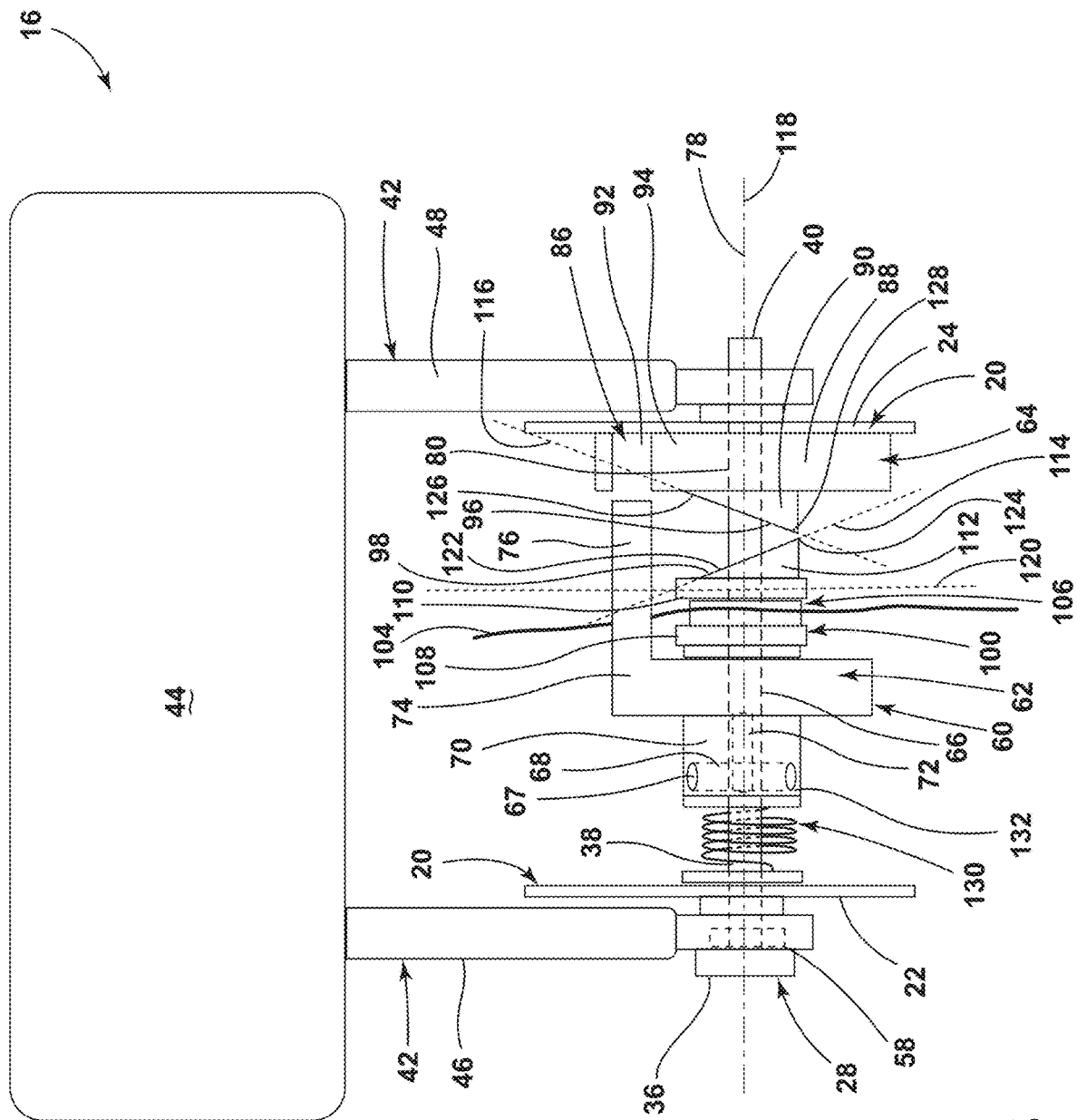
FIG. 3B is a frontal view of the headrest assembly, illustrating the lock assembly in a disengaged condition and the pulley wheel in a second position, according to one embodiment.

In various embodiments, the headrest assembly 16 may include the pivot pin 28, which may be configured to rotate relative to the support structure 20. The pivot pin 28 may be coupled with and/or engaged with the support structure 20, such that the pivot pin 28 may rotate relative to the support structure 20. For example, as illustrated in FIG. 2, the support structure 20 may define one or more apertures 30 through which the pivot pin 28 is configured to extend and the pivot pin 28 may be configured to rotate within the one or more apertures 30 defined by the support structure 20. In the embodiment illustrated in FIG. 2, the first side wall 22 of the support structure 20 includes a first aperture 32, and the second side wall 24 of the support structure 20 includes a second aperture 34. As illustrated in FIGS. 3A and 3B, the pivot pin 28 is configured to extend through both the first aperture 32 and the second aperture 34. The pivot pin 28 may include a head 36 and a shaft 38 extending outward from the head 36 to a distal end 40 that is opposite the head 36 of the pivot pin 28. A variety of types of pivot pins 28 are contemplated.

Referring now to FIGS. 2-4, the headrest assembly 16 may include the pivot member 42. The pivot member 42 may be coupled to the pivot pin 28 and may extend therefrom to a headrest body, as illustrated in FIGS. 3A and 3B. In some embodiments, the headrest assembly 16 may include a plurality of pivot members 42. For example, as shown in FIGS. 2-4, the headrest assembly 16 may include a first pivot member 46 and a second pivot member 48. As illustrated, the first pivot member 46 may be proximate to the first side wall 22 of the support structure 20 and the second pivot member 48 may be disposed proximate to the second side wall 24 of the support structure 20. In various embodiments, the support structure 20 may be disposed between the first and second pivot members 46, 48. For example, as illustrated in FIGS. 2-4, the first and second pivot members 46, 48 are outboard of the first and second side walls 22, 24 of the support structure 20.

The pivot member 42 may define an aperture through which the pivot pin 28 is configured to extend. In the embodiment illustrated in FIG. 2, the first pivot member 46 includes a first aperture 52, and the second pivot member 48 includes a second aperture 54. Both the first aperture 52 of the first pivot member 46 and the second aperture 54 of the second pivot member 48 are configured to receive the pivot pin 28 there-through. In various embodiments, the pivot member 42 may be coupled to the pivot pin 28, such that rotation of the pivot pin 28 pivots the pivot member 42 relative to the support structure 20. In implementations where the headrest assembly 16 includes a plurality of pivot members 42, at least one of the pivot members 42 may be coupled to the pivot pin 28, such that the coupled pivot member 42 pivots with the rotation of the pivot pin 28 relative to the support structure 20. For example, as illustrated in FIG. 2, the first aperture 32 of the first pivot member 46 is shaped to form a keyhole feature 56 that is configured to correspond and interlock with a key feature 58 coupled to the pivot pin 28 proximate the head 36 of the pivot pin 28. The engagement of the keyhole feature 56 with the key feature 58 interlocks the first pivot member 46 with the pivot pin 28, such that rotation of the pivot pin 28 relative to the support structure 20 causes the first pivot member 46 (and the attached headrest body 44 and second pivot member 48) to pivot relative to the support structure 20. It is contemplated that the pivot pin 28 and one or more pivot members 42 may be interlocked with each other in a variety of manners and through various types of couplings.

In the embodiments illustrated in FIGS. 2-4, the first and second pivot members 46, 48 are illustrated as posts. In some embodiments, the first and second pivot members 46, 48 may be a single connected post that converges proximate to and/or within the headrest body (not shown). A variety of types of pivot members 42 other than posts are contemplated.

Referring still to FIGS. 2-4, the headrest assembly 16 includes a lock assembly 60. The lock assembly 60 may be disposed about the pivot pin 28. For example, one or more components of the lock assembly 60 may define one or more apertures 66 through which the pivot pin 28 is configured to extend. The lock assembly 60 may be disposed between the first and second pivot members 46, 48. Further, in some embodiments, the lock assembly 60 may be disposed between the first and second side walls 22, 24 of the support structure 20. The lock assembly 60 may be operable between an engaged condition and a disengaged condition. In the engaged condition, rotation of the pivot pin 28 relative to the support structure 20 is generally prevented by the lock assembly 60. In the disengaged condition, rotation of the pivot pin 28 relative to the support structure 20 is not generally prevented by the lock assembly 60.

In the embodiment illustrated in FIGS. 2-3B, the lock assembly 60 includes first and second locking features 62, 64. The first locking feature 62 may be disposed about the pivot pin 28. For example, as illustrated in FIG. 2, the first locking feature 62 may define an aperture 66 through which the pivot pin 28 extends. The first locking feature 62 may be coupled to the pivot pin 28. In various embodiments, the first locking feature 62 may be coupled to and/or engaged with the pivot pin 28, such that the first locking feature 62 rotates with the pivot pin 28 relative to the support structure 20.

In the embodiment illustrated in FIG. 2, an engagement pin 67 is configured to extend through an engagement pin receiving aperture 68 defined by a body 70 of the first locking feature 62 in a different direction than the direction the pivot pin 28 extends through the aperture 66 defined by the first locking feature 62 (i.e., the pivot pin 28 receiving aperture 66). The pivot pin receiving aperture 66 and the engagement pin receiving aperture 68 are in communication with one another, such that the engagement pin 67, when inserted into the engagement pin receiving aperture 68, is configured to extend through a portion of the pivot pin receiving aperture 66. As illustrated in FIGS. 2-3B, the pivot pin 28 includes a recessed portion 72 along the shaft 38 of the pivot pin 28. In operation, the pivot pin 28 is inserted into the pivot pin receiving aperture 66 defined by the first locking feature 62, such that the recessed portion 72 of the shaft 38 of the pivot pin 28 generally aligns with the engagement pin receiving aperture 68 that extends through the body 70 of the first locking feature 62. The engagement pin 67 is then inserted into the engagement pin receiving aperture 68 where the engagement pin 67 engages the recessed portion 72 of the shaft 38 of the pivot pin 28, such that the first locking feature 62 rotates with the pivot pin 28 as the pivot pin 28 rotates relative to the support structure 20.

In various embodiments, the first locking feature 62 may be operable to move along the shaft 38 of the pivot pin 28 toward and/or away from the head 36 of the pivot pin 28. For example, as illustrated in FIGS. 3A and 3B, the first locking feature 62 may be operable to move from a position relatively further from the head 36 of the pivot pin 28, as shown in FIG. 3A, to a position relatively nearer to the head 36 of the pivot pin 28, as shown in FIG. 3B. In the illustrated embodiment, movement of the first locking feature 62 along the shaft 38 of the pivot pin 28 is limited at least by the ends of the recessed portion 72 of the shaft 38, due to interference between the engagement pin 67 and the ends of the recessed portion 72.

In the embodiment illustrated in FIGS. 2-4, the first locking feature 62 includes the body 70 having the engagement pin receiving aperture 68 extending there-through, as described above. The body 70 may be generally cylindrical. A disk feature 74 is coupled to the body 70 and extends outward from the pivot pin receiving aperture 66 further than the body 70 of the first locking feature 62. Relative to the body 70, the disk feature 74 is nearer to the second locking feature 64. A pawl 76 extends outward from the disk feature 74 in a direction generally parallel to an axis of rotation 78 of the pivot pin 28. The pawl 76 is configured to engage with the second locking feature 64, as described further herein.

Referring now to FIGS. 2-3B, the second locking feature 64 of the lock assembly 60 is illustrated. The second locking feature 64 may be disposed about the pivot pin 28. In the embodiment illustrated in FIGS. 2-3B, the second locking feature 64 includes an aperture 80 through which the pivot pin 28 extends. The pivot pin 28 may be configured to rotate relative to the second locking feature 64. In some embodiments, the second locking feature 64 may be coupled to the support structure 20. For example, as shown in FIG. 3B, the second locking feature 64 is coupled to the second side wall 24 of the support structure 20. In the illustrated embodiment, the second locking feature 64 includes pegs 82 configured to matingly engage with peg receiving apertures 84 defined by the second side wall 24 of the support structure 20. The pegs 82 are configured to couple the second locking feature 64 to the support structure 20, such that the pivot pin 28 rotates relative to the second locking feature 64 as the pivot pin 28 rotates relative to the support structure 20. It is contemplated that the second locking feature 64 may be coupled to the support structure 20 in a variety of manners via one or more of a variety of features configured to couple the second locking feature 64 to the support structure 20, in various embodiments.

In various embodiments, the second locking feature 64 may include a receiver 86 for receiving and engaging with the pawl 76 of the first locking feature 62. In the illustrated embodiment, the second locking feature 64 includes a disk feature 88 and a body 90 extending outward from the disk feature 88. The aperture 80 defined by the second locking feature 64 may extend through the body 90 and the disk feature 88. As illustrated in FIG. 2, the disk feature 88 may define the receiver 86 for engaging with the pawl 76 of the first locking feature 62. As illustrated, the receiver 86 may be a recess 92 defined by a peripheral edge 94 of the disk feature 88. The body 90 of the second locking feature 64 may extend outward from the disk feature 88 of the second locking feature 64 toward the first locking feature 62 and away from the second side wall 24 of the support structure 20. In some embodiments, the second locking feature 64 may include a second contact surface 96 configured to contact a first contact surface 98 of the pulley wheel 100, as described further herein. The body 90 may include the second contact surface 96. It is contemplated that the first and second locking features 62, 64 may include a variety of types of corresponding locking features. For example, in some embodiments, the first locking feature 62 may include a receiver configured to receive a pawl coupled to the second locking feature 64. Further, it is contemplated that the lock assembly 60 may include a variety of components configured to correspond with each other to selectively prevent rotational movement of the pivot pin 28 relative to the support structure 20 of the headrest assembly 16.

Referring now to FIGS. 3A and 3B, the first and second locking features 62, 64 may be operable between the engaged condition and the disengaged condition. In various embodiments, the lock assembly 60 may be in the engaged condition when the first and second locking features 62, 64 are in the engaged condition, and the lock assembly 60 may be in the disengaged condition when the first and second locking features 62, 64 are in the disengaged condition. In the engaged condition, the first and second locking features 62, 64 may be configured to generally prevent rotation of the pivot pin 28 relative to the support structure 20. In the disengaged condition, the first and second locking features 62, 64 may be configured to not prevent rotation of the pivot pin 28 relative to the support structure 20. In some embodiments, the first and second locking features 62, 64 may be relatively nearer to each other in the engaged condition and relatively further from each other in the disengaged condition. In some examples, the first locking feature 62 moves along the pivot pin 28 away from the second locking feature 64 as the first and second locking features 62, 64 transition from the engaged condition to the disengaged condition. For example, in the embodiment illustrated in FIGS. 3A, and 3B, when the first and second locking features 62, 64 are in the engaged condition (FIG. 3A) the pawl 76 of the first locking feature 62 is received into the receiver 86 of the second locking feature 64; as the first locking feature 62 moves along the pivot pin 28 away from the second locking feature 64 the pawl 76 of the first locking feature 62 egresses from the receiver 86, such that the first and second locking features 62, 64 enter the disengaged condition (FIG. 3B).

Referring now to FIGS. 2-3B, in various embodiments, the headrest assembly 16 includes the pulley wheel 100. The pulley wheel 100 may be disposed between the first and second locking features 62, 64 and may have an aperture 102 through which the pivot pin 28 is configured to extend. The pulley wheel 100 may be configured to rotate relative to the pivot pin 28. In various embodiments, the pulley wheel 100 may be configured to rotate about the pivot pin 28 relative to the second locking feature 64 and/or the support structure 20. As illustrated in FIGS. 3A and 3B, the pulley wheel 100 may be operable to rotate about the pivot pin 28 from a first position, shown in FIG. 3A, to a second position, shown in FIG. 3B. As described further herein, movement of the pulley wheel 100 from the first position to the second position may prompt the lock assembly 60 to enter the disengaged condition.

Referring now to FIGS. 2-3A, in various embodiments, a cable 104 may be operably coupled to the pulley wheel 100. In some embodiments, manipulation of the cable 104 resulting in sufficient tension in the cable 104 may prompt the pulley wheel 100 to rotate about the pivot pin 28 from the first position to the second position. For example, the cable 104 may be operable to move between an extended position and a retracted position due to sufficient tension in the cable 104, wherein movement of the cable 104 from the retracted position to the extended position is configured to rotate the pulley wheel 100 from the first position to the second position. As such, manipulation of the cable 104 may prompt the lock assembly 60 to transition from the engaged condition to the disengaged condition via movement of the pulley wheel 100 from the first position to the second position.

In the illustrated embodiment, the pulley wheel 100 includes a cable receiving portion 106 bounded by first and second flanges 108, 110 and a body 112 coupled to the cable receiving portion 106 that includes the first contact surface 98. The first contact surface 98 of the pulley wheel 100 may correspond with the second contact surface 96 of the second locking feature 64. The first contact surface 98 may be configured to contact the second contact surface 96. Contact between the first and second contact surfaces 98, 96 as the pulley wheel 100 rotates from the first position to the second position about the pivot pin 28 may cause the pulley wheel 100 to move along the pivot pin 28 away from the second locking feature 64, as illustrated in FIGS. 3A and 3B. In the embodiment illustrated in FIGS. 3A-3B, the first and second contact surfaces 98, 96 respectively define first and second planes 114, 116. The first and second planes 114, 116 may be angled between an axis of rotation 118 of the pulley wheel 100 and a plane 120 perpendicular to the axis of rotation 118 of the pulley wheel 100. The first and second planes 114, 116 may be closer to parallel to each other in the first position of the pulley wheel 100 than in the second position of the pulley wheel 100. In some embodiments, the first and second planes 114, 116 may be substantially parallel to each other in the first position of the pulley wheel 100, as illustrated in FIG. 3A.

The first contact surface 98 includes an inboard-most portion 122 and an outboard-most portion 124. The inboard-most portion 122 may be disposed nearer to the cable receiving portion 106 of the pulley wheel 100 than the outboard-most portion 124 of the first contact surface 98. As illustrated in FIG. 3A, the inboard-most portion 122 of the first contact surface 98 may be the portion of the first contact surface 98 that is nearest to the first side wall 22 of the support structure 20 and the outboard-most portion 124 of the first contact surface 98 may be the portion of the first contact surface 98 that is furthest from the first side wall 22 of the support structure 20. The second contact surface 96 of the second locking feature 64 may include an inboard-most portion 126 and an outboard-most portion 128. The outboard-most portion 128 may be further from the disk feature 88 of the second locking feature 64 than the inboard-most portion 126 of the second contact surface 96. The inboard-most portion 126 of the second contact surface 96 may be the portion of the second contact surface 96 that is nearest to the second side wall 24 of the support structure 20 and the outboard-most portion 128 of the second contact surface 96 may be the portion of the second contact surface 96 that is furthest from the second side wall 24 of the support structure 20.

As illustrated in FIGS. 3A and 3B, the first and second contact surfaces 98, 96 are configured to contact each other. As shown in FIG. 3A, the first and second contact surfaces 98, 96 may be generally flush with one another when the pulley wheel 100 is in the first position. In some embodiments, the outboard-most portion 124 of the first contact surface 98 may be nearer to the inboard-most portion 126 of the second contact surface 96 in the first position of the pulley wheel 100 than in the second position of the pulley wheel 100. The outboard-most portion 128 of the second contact surface 96 may be nearer to the inboard-most portion 122 of the first contact surface 98 in the first position of the pulley wheel 100 relative to the second position of the pulley wheel 100. For example, in the first position of the pulley wheel 100, the first contact surface 98 may be in contact with the second contact surface 96, such that the outboard-most portion 124 of the first contact surface 98 is adjacent to the inboard-most portion 126 of the second contact surface 96 and the outboard-most portion 128 of the second contact surface 96 is adjacent to the inboard-most portion 122 of the first contact surface 98, as illustrated in FIG. 3A. In the second position of the pulley wheel 100, the first and second contact surfaces 98, 96 contact each other, such that the outboard-most portion 124 of the first contact surface 98 is adjacent to the outboard-most portion 128 of the second contact surface 96 and the inboard-most portions 122, 126 of the first and second contact surfaces 98, 96 are in a spaced relationship, as illustrated in FIG. 3B.

The change in position of the inboard-most and outboard-most portions of the first and second contact surfaces 98, 96 relative to each other, as the pulley wheel 100 rotates about the pivot pin 28 from the first position to the second position, causes the pulley wheel 100 to move along the pivot pin 28 away from the second locking feature 64. As the pulley wheel 100 moves away from the second locking feature 64 along the pivot pin 28, the first locking feature 62 is influenced by the pulley wheel 100, such that the first locking feature 62 also moves along the pivot pin 28 away from the second locking feature 64. In the embodiment depicted in FIGS. 3A and 3B, a washer is disposed between the pulley wheel 100 and the first locking feature 62, such that the pulley wheel 100 indirectly applies force to the first locking feature 62 to move the first locking feature 62 along the pivot pin 28; however, embodiments in which the pulley wheel 100 applies a direct force to the first locking feature 62 via contact between the pulley wheel 100 and the first locking feature 62 are contemplated.

Referring to FIGS. 2-3B, the headrest assembly 16 may include a biasing feature 130. In some embodiments, the biasing feature 130 may be disposed between the first and second pivot members 46, 48. The biasing feature 130 may be disposed between the first and second side walls 22, 24 of the support structure 20. As illustrated in FIGS. 2-3B, in some implementations, the biasing feature 130 may be disposed between the first side wall 22 of the support structure 20 and the first locking feature 62. In some embodiments, the biasing feature 130 may be coupled to the pivot pin 28. The biasing feature 130 may be disposed about the pivot pin 28. For example, in the embodiment illustrated in FIGS. 2-3B, the biasing feature 130 includes a coil spring 132 that is at least partially coiled about the pivot pin 28. In other words, the coil spring 132 generally defines a tunnel through which the pivot pin 28 extends. In the embodiment illustrated in FIG. 2, the coil spring 132 is formed of a single wire that extends from a first end to a second end. The first end is configured to be engaged with the first side wall 22 of the support structure 20 by extending through a coil spring 132 receiving aperture defined by the first side wall 22 of the support structure 20 and the second end of the coil spring 132 is configured to be engaged with a cavity defined by the body 70 of the first locking feature 62. Washers are provided between the coil spring 132 and the first side wall 22 of the support structure 20 and between the coil spring 132 and the first locking feature 62 in the embodiment illustrated in FIGS. 2-3B; however, embodiments that do not include the washers are contemplated. It is further contemplated that the biasing feature 130 may be at least one of a variety of features that may include, but is not limited to, an elastic band, various types of springs, a piston, etc.

In various embodiments, the biasing feature 130 may be configured to bias the lock assembly 60. The biasing feature 130 may be configured to bias the lock assembly 60 to yieldingly retain the lock assembly 60 in the engaged condition. In some implementations, the biasing feature 130 may be configured to yieldingly bias the first locking feature 62 toward the second locking feature 64. The biasing feature 130 may be configured to yieldingly retain the first locking feature 62 in the engaged condition, as shown in FIG. 3A. Further, in some embodiments, the biasing feature 130 may be configured to apply a force to the first locking feature 62 in the disengaged condition to move the first locking feature 62 toward the second locking feature 64, such that the first and second locking features 62, 64 enter the engaged condition.

Referring now to FIG. 2, in some embodiments, the headrest assembly 16 may include a pivot pin retainer 134 configured to maintain the pivot pin 28 within the first aperture 52 defined by the first pivot member 46 and the second aperture 54 defined by the second pivot member 48. For example, as illustrated in FIG. 2, a retention washer 136 is configured to correspond with a recessed ring 138 proximate to the distal end 40 of the shaft 38 of the pivot pin 28. The retention washer 136 while engaged with the recessed ring 138 generally prevents the pivot pin 28 from being removed from the first and second apertures 52, 54 of the first and second pivot members 46, 48, respectively.

In operation of an exemplary embodiment of the headrest assembly 16, the first and second pivot members 46, 48 and the headrest body 44 coupled to the first and second pivot members 46, 48 may pivot relative to the support structure 20 as follows. Initially, the lock assembly 60 is in the engaged condition, such that the pivot pin 28 is generally prevented from rotating relative to the support structure 20, as illustrated in FIG. 3A. The first contact surface 98 of the pulley wheel 100 is aligned with the second contact surface 96 of the second locking feature 64, such that the outboard-most portion 124 of the first contact surface 98 is adjacent to the inboard-most portion 126 of the second contact surface 96 and the outboard-most portion 128 of the second contact surface 96 is adjacent to the inboard-most portion 122 of the first contact surface 98; this orientation of the first and second contact surfaces 98, 96 enables the first locking feature 62 to be near enough to the second locking feature 64 that the pawl 76 of the first locking feature 62 may be received within the receiver 86 of the second locking feature 64. The biasing feature 130 yieldingly biases the first locking feature 62, such that the pawl 76 is received within the receiver 86. Next, the cable 104 coupled to the pulley wheel 100 is manipulated, such that sufficient tension exists within the cable 104 to rotate the pulley wheel 100 about the pivot pin 28 from the first position toward the second position. Rotation of the pulley wheel 100 toward the second position causes the outboard-most portion 124 of the first contact surface 98 to rotate away from the inboard-most portion 126 of the second contact surface 96 toward the outboard-most portion 128 of the second contact surface 96. As this rotation occurs, the shifting contact between the first contact surface 98 of the pulley wheel 100 and the second contact surface 96 of the second locking feature 64 moves the pulley wheel 100 toward the first side wall 22 of the support structure 20. The pulley wheel 100 exerts a force on the first locking feature 62 that moves the first locking feature 62 along the pivot pin 28 away from the second locking feature 64 against the bias of the biasing feature 130. The pawl 76 egresses from the receiver 86 and the lock assembly 60 enters the disengaged condition, as illustrated in FIG. 3B. In the disengaged condition, the first locking feature 62 is free to rotate with the pivot pin 28 as the pivot pin 28 rotates relative to the support structure 20. Further, by virtue of the engagement between the key feature 58 of the pivot pin 28 and the keyhole feature 56 of the first pivot member 46, the first pivot member 46, as well as the attached headrest body 44 and second pivot member 48, pivot relative to the support structure 20 as the pivot pin 28 rotates. Thus, the headrest body 44 may move from an upright position to a pivoted position, as illustrated in phantom in FIG. 4.

The present disclosure may provide a variety of advantages. First, the lock assembly 60, pulley wheel 100, and biasing feature 130 all being disposed about the pivot pin 28 may result in a compact, space-saving headrest assembly 16. Second, pivoting the headrest assembly 16 from the upright position to the pivoted position illustrated in phantom in FIG. 4 may aid in configuring the seating assembly 10 in a manner that is suitable for stowing the seating assembly 10 within the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A headrest assembly, comprising:
first and second pivot members extending outward from a headrest body;
a pivot pin extending between the first and second pivot members and rotatably coupled to a support structure, wherein the first and second pivot members are configured to pivot relative to the support structure with rotation of the pivot pin relative to the support structure;
a first locking feature coupled to the pivot pin between the first and second pivot members and having an aperture through which the pivot pin extends, wherein the first locking feature is configured to rotate with rotation of the pivot pin relative to the support structure;
a second locking feature coupled to the support structure between the first and second pivot members and having an aperture through which the pivot pin extends, wherein the pivot pin is configured to rotate relative to the second locking feature, the first and second locking features being operable between an engaged condition, wherein the first and second locking features are relatively nearer to each other and rotation of the pivot pin relative to the support structure is generally prevented by the first and second locking features, and a disengaged condition; and
a pulley wheel disposed between the first and second locking features and having an aperture through which the pivot pin extends, the pulley wheel being operable to rotate about the pivot pin from a first position to a second position, wherein rotation from the first position to the second position moves the first locking feature further away from the second locking feature, such that the first and second locking features enter the disengaged condition.

2. The headrest assembly of claim 1, further comprising:
a biasing feature disposed between the first and second pivot members and configured to yieldingly bias the first locking feature toward the second locking feature.

3. The headrest assembly of claim 2, wherein the biasing feature comprises a coil spring at least partially coiled about the pivot pin.

4. The headrest assembly of claim 1, wherein the pulley wheel comprises:
a first contact surface; and
the second locking feature comprises:
a second contact surface configured to contact the first contact surface of the pulley wheel, wherein contact between the first and second contact surfaces as the pulley wheel rotates from the first position to the second position about the pivot pin causes the pulley wheel to move along the pivot pin away from the second locking feature.

5. The headrest assembly of claim 4, wherein the first and second contact surfaces respectively define first and second planes, each angled between an axis of rotation of the pulley wheel and a plane perpendicular to the axis of rotation, wherein the first and second planes are closer to parallel to each other in the first position of the pulley wheel than the second position of the pulley wheel.

6. The headrest assembly of claim 5, wherein the first plane is substantially parallel to the second plane in the first position of the pulley wheel.

7. A headrest assembly, comprising:
a pivot pin;
a support structure operably coupled to the pivot pin, wherein the pivot pin is configured to rotate relative to the support structure;
a pivot member coupled to the pivot pin, wherein the pivot member is configured to rotate with the pivot pin to pivot a headrest body coupled to the pivot member;
a first locking feature coupled to the pivot pin and configured to rotate with the pivot pin;
a second locking feature coupled to the support structure, the first and second locking features being operable between a disengaged condition and an engaged condition, wherein the first and second locking features generally prevent rotation of the pivot pin relative to the support structure; and
a pulley wheel operably coupled to the pivot pin between the first and second locking features and operable to rotate about the pivot pin from a first position to a second position, wherein rotation of the pulley wheel from the first position to the second position prompts the first and second locking features to enter the disengaged condition.

8. The headrest assembly of claim 7, further comprising:
a biasing feature coupled to and configured to yieldingly bias the first locking feature toward the second locking feature.

9. The headrest assembly of claim 8, wherein the biasing feature comprises a coil spring at least partially coiled about the pivot pin.

10. The headrest assembly of claim 7, wherein at least one of the first and second locking features defines an aperture through which the pivot pin extends.

11. The headrest assembly of claim 7, wherein the pulley wheel is configured to move along the pivot pin away from the second locking feature as the pulley wheel rotates about the pivot pin from the first position to the second position.

12. The headrest assembly of claim 7, wherein the first locking feature comprises a pawl configured to be received by a receiver of the second locking feature in the engaged condition of the first and second locking features.

13. The headrest assembly of claim 7, further comprising:
a cable operably coupled to the pulley wheel and operable to move between an extended position and a retracted position, wherein movement of the cable from the retracted position to the extended position is configured to rotate the pulley wheel from the first position to the second position.

14. A headrest assembly, comprising:
a pivot pin rotatably coupled to a support structure;
a pivot member that extends outward from a headrest body coupled to the pivot pin;
a lock assembly having first and second locking features disposed about the pivot pin and operable between a disengaged condition and an engaged condition, wherein rotation of the pivot pin relative to the support structure is generally prevented; and
a pulley wheel positioned between the first and second locking features and operable to rotate about the pivot pin from a first position to a second position to prompt the lock assembly to enter the disengaged condition.

15. The headrest assembly of claim 14, further comprising:
a biasing feature configured to bias the lock assembly to yieldingly retain the lock assembly in the engaged condition.

16. The headrest assembly of claim 14, wherein the first locking feature defines an aperture through which the pivot pin extends, and
the second locking feature defines an aperture through which the pivot pin extends, wherein the first and second locking features are configured to be engaged with each other to generally prevent rotation of the pivot pin relative to the support structure in the engaged condition of the lock assembly.

17. The headrest assembly of claim 16, wherein the first locking feature is operably coupled to the pivot pin, such that the first locking feature is configured to rotate with the pivot pin as the pivot pin rotates relative to the support structure, and the pivot pin is configured to rotate relative to the second locking feature.

18. The headrest assembly of claim 16, wherein the pulley wheel is configured to move along the pivot pin away from the second locking feature as the pulley wheel rotates about the pivot pin from the first position to the second position.

19. The headrest assembly of claim 18, further comprising:

a cable operably coupled to the pulley wheel and operable to move between an extended position and a retracted position, wherein movement of the cable from the retracted position to the extended position is configured to rotate the pulley wheel from the first position to the second position.

* * * * *